(12) United States Patent
Zhang et al.

(10) Patent No.: US 12,504,404 B2
(45) Date of Patent: Dec. 23, 2025

(54) APPARATUS AND METHOD FOR TESTING SENSITIVITY CONSISTENCY OF ACOUSTIC EMISSION SENSOR

(71) Applicant: China Special Equipment Inspection and Research Institute, Beijing (CN)

(72) Inventors: Junjiao Zhang, Beijing (CN); Yongna Shen, Beijing (CN); Gongtian Shen, Beijing (CN); Zhiquan Wang, Beijing (CN); Daqing Chen, Beijing (CN)

(73) Assignee: China Special Equipment Inspection and Research Institute, Beijing (CN)

( * ) Notice: Subject to any disclaimer, the term of this patent is extended or adjusted under 35 U.S.C. 154(b) by 318 days.

(21) Appl. No.: 18/474,985

(22) Filed: Sep. 26, 2023

(65) Prior Publication Data

US 2024/0167982 A1   May 23, 2024

(30) Foreign Application Priority Data

Nov. 3, 2022   (CN) .......................... 202211372326.8

(51) Int. Cl.
  *G01N 29/30*   (2006.01)
  *G01N 29/04*   (2006.01)
  *G01N 29/14*   (2006.01)

(52) U.S. Cl.
  CPC ............. *G01N 29/30* (2013.01); *G01N 29/04* (2013.01); *G01N 29/14* (2013.01)

(58) Field of Classification Search
  CPC ........ G01N 29/30; G01N 29/04; G01N 29/14; G01N 29/11
  See application file for complete search history.

(56) References Cited

PUBLICATIONS

"Research On Testing Method and Device of Sensitivity Consistency of Acoustic Emission Sensors" by Zhang et al. (Year: 2022).*
ASTM E2075/E2075M-15 (Year: 2020).*

* cited by examiner

*Primary Examiner* — Xin Y Zhong
(74) *Attorney, Agent, or Firm* — Lowenstein Sandler LLP

(57) ABSTRACT

An apparatus and method for testing sensitivity consistency of an acoustic emission sensor are provided. The apparatus uses a cylindrical polymethyl methacrylate (PMMA) rod as a test bench. A clamping seat, a clamping block, and a mounting cylinder are mounted on one end of the test bench in cooperation. Under an action of a pressure spring, an end face of a tested sensor keeps pressure-stable coupling contact with an end face of the test bench. A bracket is mounted on another end face of the test bench, and keeps, together with a fixing seat and the clamping seat, the test bench horizontally placed on a desktop. By adjusting a width and an amplitude of a pulse excitation signal of a signal generator, and according to sensitivity distribution and aggregation between tested sensors, a consistency calculation method is used to screen out tested sensors with first, second, and third sensitivity consistency.

4 Claims, 6 Drawing Sheets

APPARATUS AND METHOD FOR TESTING SENSITIVITY CONSISTENCY OF ACOUSTIC EMISSION SENSOR

CROSS REFERENCE TO RELATED APPLICATION

This patent application claims the benefit and priority of Chinese Patent Application No. 202211372326.8, filed with the China National Intellectual Property Administration on Nov. 3, 2022, the disclosure of which is incorporated by reference herein in its entirety as part of the present application.

TECHNICAL FIELD

The present disclosure relates to the field of acoustic emission technologies, and in particular, to an apparatus and method for testing sensitivity consistency of an acoustic emission sensor.

BACKGROUND

Acoustic emission inspection is commonly used for integrity detection and safety evaluation of large-scale structures, for example, detection and monitoring of large-scale pressure vessels, tanks, hoisting machinery, and construction steel structures. According to an actual condition of a detection object, several to dozens of acoustic emission sensors need to be mounted for detection and positioning. Acoustic emission sensors with good sensitivity consistency are a premise for effective and reliable detection results, and guarantee of accurate positioning and evaluation of acoustic emission sources in the detection object.

A pre-delivery inspection of an acoustic emission sensor can ensure high sensitivity, meeting requirements of detection standards, and qualified quality. After the acoustic emission sensor is put into use, sensitivity of the sensor is prone to reduce due to a harsh on-site environment, wear and tear, an improper operation, and the like. Currently, for calibration of an acoustic emission-related device, only one calibration measurement of the acoustic emission sensor is required every year. Calibration is based on GB/T 19800 Non-destructive testing-Acoustic emission inspection-Primary calibration of transducers and GB/T 19801 Non-destructive testing-Acoustic emission inspection-Secondary calibration of acoustic emission sensors. The following problems occur when the acoustic emission sensor is calibrated based on GB/T 19800 and GB/T 19801:

1. An excitation source is a step function force source, which is generated by a broken glass capillary tube. Specifically, a glass capillary tube with a diameter of about 0.2 mm is horizontally placed on a test block, and a force is applied to the capillary tube by using a solid glass rod. The glass rod exerts a force downward by using a loading screw until the capillary tube is broken. An apparatus of this excitation manner is complex and difficult to operate, and an excitation effect is unstable.

2. The test block is a steel cylinder test block. To reduce an influence of a boundary effect, a diameter of the cylinder test block is not less than 400 mm, a height is not less than 180 mm, and the test block is large in size and very heavy.

3. A standard capacitance sensor of a reference sensor is used for primary calibration. A National Bureau of Standards (NBS) cone transducer is used for secondary calibration, which is not available on the market.

4. A transient recorder or an oscilloscope is used to record data, and then a computer is used to perform complex calculation on recorded data to obtain a result.

5. Calibration is a test for each sensor. A direct result of a difference between a group of sensors cannot be given, that is, no applicable result is given for consistency of the group of sensors used for on-site detection.

6. Annual calibration can only ensure that sensitivity of a single tested sensor meets a minimum detection requirement during testing and for a period of time before testing, but it is impossible to know a situation after calibration and wear and tear. Due to lacking of testing of sensitivity consistency of the acoustic emission sensor before an actual detection, there is often a large difference in detection sensitivity during the acoustic emission inspection, resulting in inaccurate positioning and quantitative detection results.

In conclusion, an existing acoustic emission sensor test method needs to use a complex electronic instrument and a heavy large-scale steel test block. The whole set of apparatus is complex, high in costs, and complex in test calculation. A general user has no test condition and capability. In particular, a capillary glass tube is used as an excitation source, and a standard capacitive sensor needs to be used as a reference object in primary calibration. A general user has no condition and capability for performing sensor calibration. If all sensors are sent to a metrology institute for calibration before each detection, costs are high and efficiency is low. Therefore, a convenient and effective method for testing sensitivity consistency of an acoustic emission sensor is urgently required, to ensure that a user can test and evaluate consistency of an acoustic emission sensor before each detection implementation or during routine instrument maintenance, thereby ensuring validity and reliability of detection data and improving detection efficiency.

SUMMARY

The present disclosure aims to provide a test method and apparatus for untimely and inconvenient calibration and inability to provide consistency information in the conventional technology.

To achieve the above objective, the present disclosure adopts the following technical solutions:

An apparatus for testing sensitivity consistency of an acoustic emission sensor, including a signal generator 2, an emission sensor 3, a first signal line 5, a preamplifier 6, a second signal line 7, an acoustic emission instrument 8, a computer device 9, and a third signal line 10, where a tested sensor 4 is successively connected to the first signal line 5, the preamplifier 6, and the second signal line 7, and transmits a tested signal to the acoustic emission instrument 8 and the computer device 9; the computer device 9 calculates and displays an amplitude of an acquired acoustic emission signal;

a cylindrical polymethyl methacrylate (PMMA) rod with a length of 1000 mm and a diameter of 50 mm is used as a test bench 1, and one end of the test bench 1 near the tested sensor 4 is a near end face, and an opposite end is a far end face; and the emission sensor 3 is placed in a fixing seat 11 at a distance of 300 mm from the near end face of the test bench 1, and is fixedly by using a cover plate 12 to keep stable coupling contact with a surface of the test bench, and the emission sensor 3 is connected to the signal generator 2 by using the third signal line 10; a clamping seat 13 is mounted on the near end face of the test bench 1 by using a clamping block 16; the tested sensor 4 is disposed in a mounting cylinder 14, there is a circular ear plate on a body of the mounting cylinder, a pressure spring 15 is disposed inside the mounting cylinder, the circular ear plate and the mounting cylinder 14 are inserted into a clamping groove corresponding to the clamping seat 13 through pressing, and under an action of the pressure spring 15, an end face of the tested sensor 4 keeps pressure-stable coupling contact with the end face of the test bench; and the bracket 17 is mounted on the far end face of the test bench 1, and keeps, together with the fixing seat 11 and the clamping seat 13, the test bench horizontally placed on a desktop.

A method for testing sensitivity consistency of an acoustic emission sensor based on the foregoing apparatus includes the following steps:

step 1: conducting signal excitation and reception, specifically: adjusting a width and an amplitude of a pulse excitation signal of the signal generator 2, so that an amplitude of an acoustic emission signal received by the tested sensor 4 reaches 80% of a full-span value of the amplitude; and when the pulse signal remains unchanged, successively testing, in a same location, response amplitudes of the acoustic emission signal received by other sensors 4;

step 2: testing a sensitivity consistency deviation $\Delta A_i$, where a total quantity of tested sensors 4 is n, and an amplitude obtained by an $i^{th}$ tested sensor 4 is A(i) in dB; and an average amplitude of all the tested sensors (4) is $\overline{A_i}$, and $$\overline{A_i} = \frac{\sum_{i=1}^{n} A(i)}{n};$$

and setting a sensitivity consistency deviation threshold to X dB, observing amplitudes of all the tested sensors, denoting a sensitivity value of a tested sensor 4 whose value exceeds a value of $\overline{A_i}$ by $\pm X$ dB as $A(i)_{I(j)}$, and recording a quantity of tested sensors 4 with $A(i)_{I(j)}$ as m, where in this case, a sensitivity consistency deviation $\Delta A_i$ of each tested sensor 4 in a threshold range is:

$$\Delta A_i = \left| \frac{A(i) - \overline{A_{iX}}}{\overline{A_{iX}}} \right| \times 100\% \text{ and } \overline{A_{iX}} = \frac{\sum_{i=1}^{n} A(i) - \sum_{j=1}^{m} A(i)_{I(j)}}{n - m}$$

a sensitivity consistency deviation $\Delta A_{iX}$ calculated based on the sensitivity consistency deviation threshold is $$\Delta A_{iX} = \frac{X}{\overline{A_{iX}}} \times 100\%;$$

and step 3: comparing consistency of the tested sensors 4; determining a first preset deviation range and a second preset deviation range according to models of the tested sensors and a detection requirement, where any value in the first preset deviation range is less than any value in the second preset deviation range, and the any value in the second preset deviation range is less than the sensitivity consistency deviation $\Delta A_{iX}$ calculated based on the sensitivity consistency deviation threshold; and when $\Delta A_i$ belongs to the first preset deviation range, first sensitivity consistency is met; when $\Delta A_i$ belongs to the second preset deviation range, second sensitivity consistency is met; or when $\Delta A_i$ exceeds the second preset deviation range, it is third sensitivity consistency; determining, according to $\Delta A_i$ obtained by each tested sensor 4, that a range of sensitivity consistency of the tested sensor belongs to the first sensitivity consistency, the second sensitivity consistency, or the third sensitivity consistency; according to a requirement of actual detection for a quantity of sensors, preferably selecting multiple tested sensors 4 within a first sensitivity consistency range for acoustic emission inspection; and when a quantity of the tested sensors 4 in the first sensitivity consistency range does not meet a detection requirement, selecting multiple tested sensors 4 in a second sensitivity consistency range, and so on.

Further, the emission sensor selects a broadband sensor, and a frequency band range of the broadband sensor is capable of covering a frequency band range of the tested sensor, or a sensor of a same model as the tested sensor is used as the emission sensor.

Further, an excitation signal modulated by the signal generator is excited by using a single pulse signal, and width selection of the pulse signal matches a frequency band feature of the tested sensor.

Compared with the conventional technology, the present disclosure has the following beneficial effects:

1. A sensitivity consistency test of the acoustic emission sensor is to test relative consistency of a batch of sensors. All the tested sensors are directly tested for evaluation, without using a reference sensor.

2. An acoustic emission instrument system is directly used in the test to obtain the signal amplitude received by the sensor. There is no need to use another device and perform complex calculations, simplifying the test apparatus. The test method is simple and fast, and is easy for a user to operate, and the user can perform the sensitivity consistency test on the sensor at any time as required.

3. Sensitivity consistency of the acoustic emission sensor is calculated by using a sensor with highest sensitivity as a reference, so that a sensor within a preset deviation range of sensitivity consistency is selected. In this way, on a premise of ensuring that the sensor has high sensitivity, a batch of sensors with good sensitivity consistency is selected for acoustic emission inspection, which provides more reliable guarantee for accuracy of a result of on-site acoustic emission inspection.

4. The test apparatus has good reproducibility, and the test is convenient, efficient, and portable. (1) For a manner in which the generator modulates a pulse signal to excite the emission sensor, the device is simple, easy to operate, and free from human interference. A parameter of an excitation signal can be adjusted according to the tested sensor. (2) The cylindrical PMMA rod with a length of 1000 mm and a diameter of 50 mm is used as the test bench, so that the test bench is low cost, light, easy to store and use. (3) The cylindrical PMMA rod is used as the test bench, effectively avoiding interference from an echo from an end face of a side of a cylinder on which no sensor is mounted to the amplitude of the acoustic emission signal received by the tested sensor.

5. The clamping seat, the fixing seat, and the bracket are used together to fix the cylindrical PMMA rod, so that the cylindrical PMMA rod do not scroll on the desktop, ensuring stability of the test bench. The mounting cylinder is used to place the tested sensor for inserting the tested sensor into the clamping seat, and the pressure spring is used to apply a fixed pressure to the sensor and the end face of the test bench. This not only facilitates successive replacement of the tested sensors, but also ensures consistency of a coupling location and pressure between each tested sensor and the test bench.

According to the method for testing sensitivity consistency of an acoustic emission sensor in the present disclosure, the method is convenient, efficient, low-cost, and easy for the user to operate. An acoustic emission sensor that is in a group of sensors used for acoustic emission positioning and detection and whose sensitivity consistency is insufficient can be found in time before implementation of acoustic emission inspection or in routine device maintenance, to timely replace the acoustic emission sensor, thereby improving efficiency of on-site acoustic emission inspection, and ensuring reliability of the result of the acoustic emission inspection. According to the method and apparatus for testing sensitivity consistency of an acoustic emission sensor provided in the present disclosure, the signal generator is used to generate an excitation signal in a center of the PMMA rod test bench. A single variable control method is used to measure a deviation between sensitivity consistency of acoustic emission sensors of a same model, and the deviation is compared with that in a preset consistency deviation range, to perform the sensitivity consistency test of the acoustic emission sensor.

Figure 1:
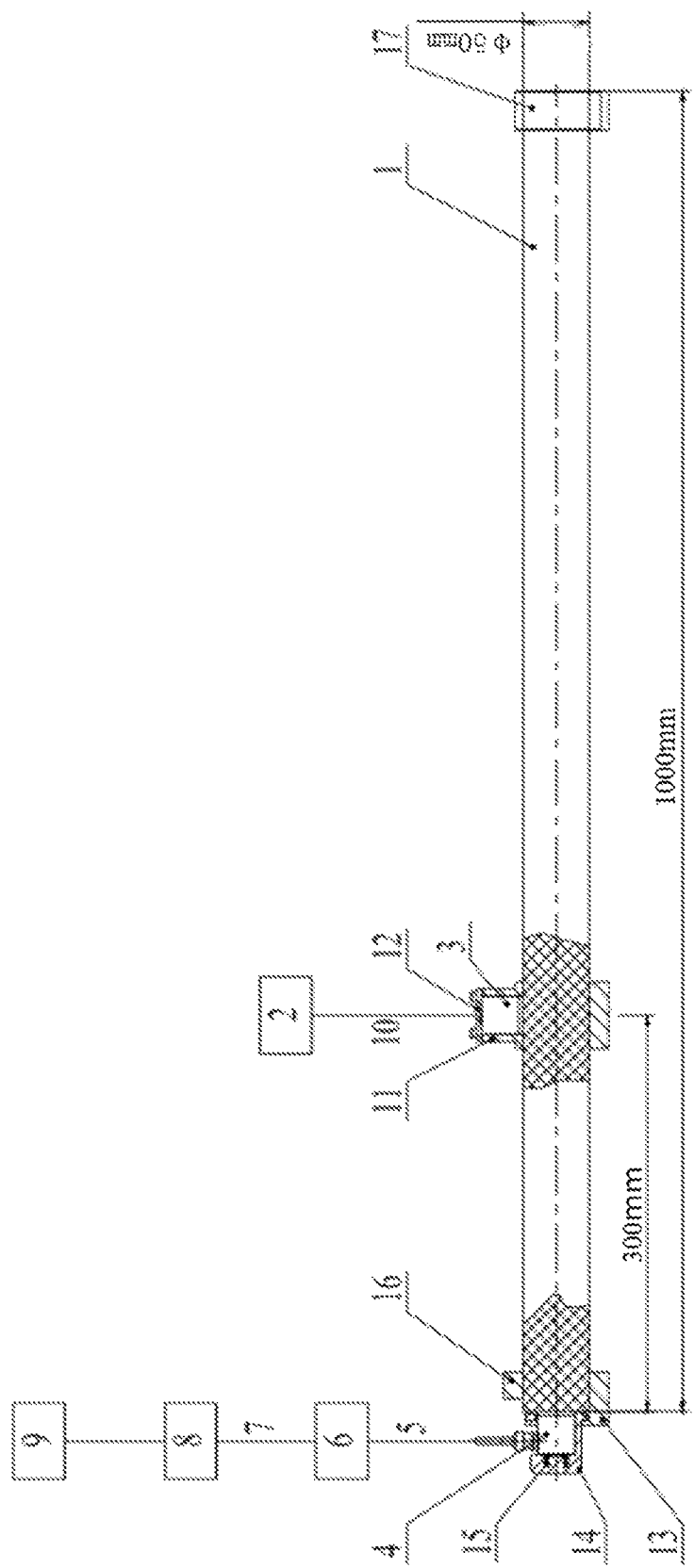
FIG. 1 is a schematic diagram of a test apparatus according to the present disclosure.
Figure 2:
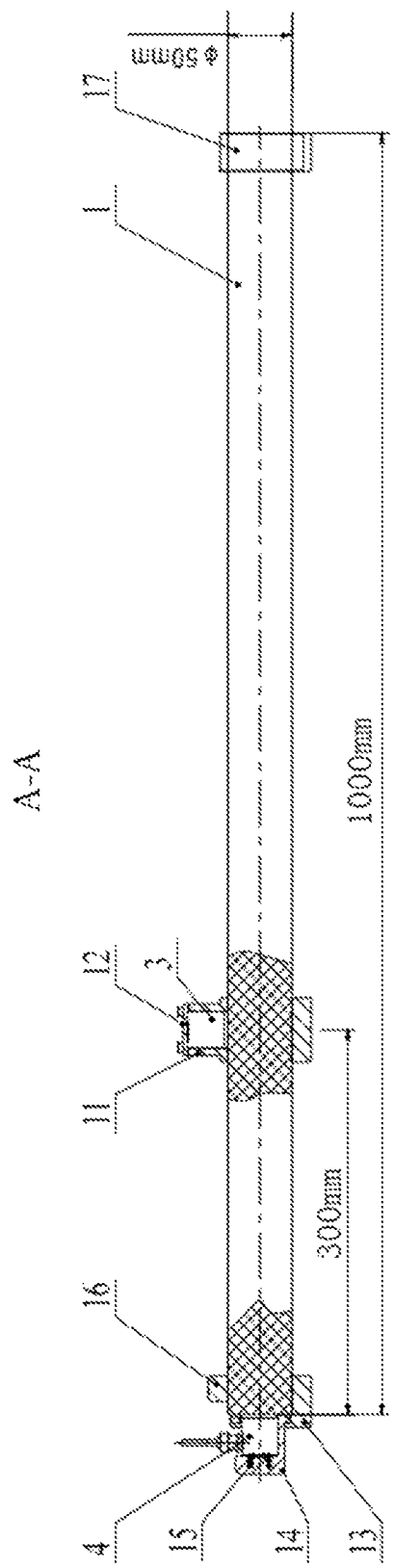
FIG. 2 shows a section view of a clamping seat, a mounting cylinder, a pressure spring, a clamping block, a fixing seat, a cover plate, and a bracket mounted at a test bench along A-A direction.
Figure 3:
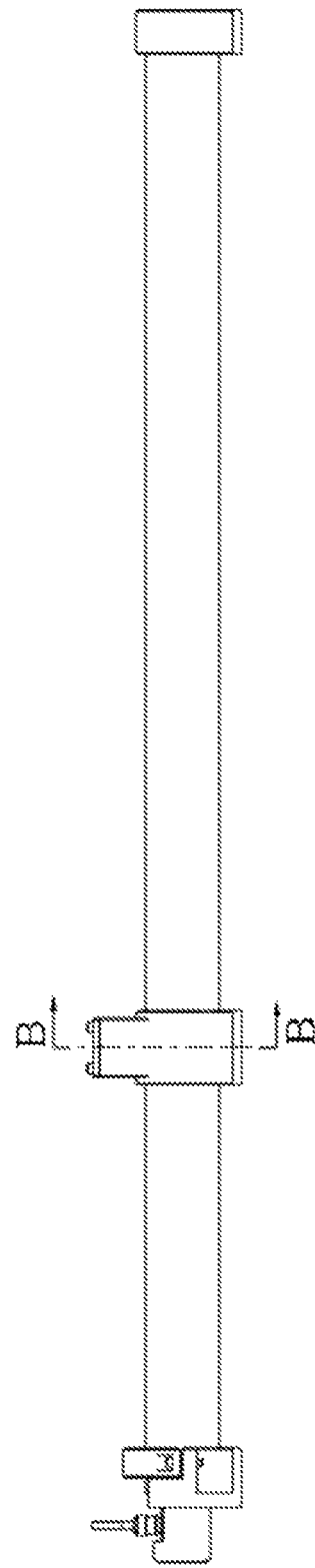
FIG. 3 shows a front view of the clamping seat, the mounting cylinder, the pressure spring, the clamping block, the fixing seat, the cover plate, and the bracket mounted at the test bench.
Figure 4:
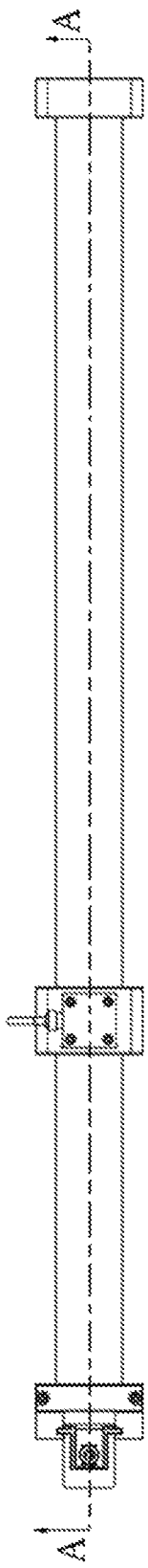
FIG. 4 shows a top view of the clamping seat, the mounting cylinder, the pressure spring, the clamping block, the fixing seat, the cover plate, and the bracket mounted at the test bench.
Figure 5:
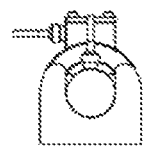
FIG. 5 shows a left view of the clamping seat, the mounting cylinder, the pressure spring, the clamping block, the fixing seat, the cover plate, and the bracket mounted at the test bench.
Figure 6:
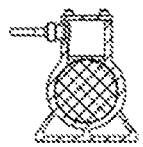
FIG. 6 shows a section view of the clamping seat, the mounting cylinder, the pressure spring, the clamping block, the fixing seat, the cover plate, and the bracket mounted at the test bench along B-B direction.

Correspondences between components and reference numerals are: test bench 1, signal generator 2, emission sensor 3, multiple tested sensors 4, first signal line 5, preamplifier 6, second signal line 7, acoustic emission instrument 8, computer device 9, third signal line 10, fixing seat 11, cover plate 12, clamping seat 13, mounting cylinder 14, pressure spring 15, clamping block 16, and bracket 17.

DETAILED DESCRIPTION OF THE EMBODIMENTS

The technical solutions of the present disclosure are described in detail below with reference to the accompanying drawings and specific embodiments.

According to a method for testing sensitivity consistency of an acoustic emission sensor, two groups of 18 acoustic emission sensors of a same model (a frequency band range of a first group of acoustic emission sensors is 100 kHz-450 kHz, and a center frequency is 150 kHz; and a frequency band range of a second group of acoustic emission sensors is 100 kHz-850 kHz, and a center frequency is 350 kHz) are used as an example to separately perform sensitivity consistency test and evaluation.

Step 1: Set up the test apparatus. As shown in FIG. 1, the apparatus includes: a test bench 1 being a cylindrical PMMA rod with a length of 1000 mm and a diameter of 50 mm, a signal generator 2, an emission sensor 3 with a frequency band range of 100 kHz-900 kHz, multiple tested sensors 4 divided into two groups of 18 each, a first signal line 5, a preamplifier 6, a second signal line 7, an acoustic emission instrument 8, a computer device 9, and a third signal line 10.

A clamping seat 13 is mounted at one end of the test bench 1, and the clamping seat 13 is fixed to an end face of the test bench by using a clamping block 16. This end face is a near end face of the test bench 1 and an opposite end face is a far end face. One tested sensor 4 in the first group is put into a mounting cylinder 14, and a wiring port of the tested sensor is provided with an avoidance groove at a location corresponding to the mounting cylinder. A pressure spring 15 is disposed inside the mounting cylinder 14, there is a circular ear plate on a body of the mounting cylinder, the circular ear plate and the mounting cylinder 14 are inserted into a clamping groove corresponding to the clamping seat 13 by pressing the tested sensor 4 by hand, and under an action of the pressure spring 15, an end face of the tested sensor 4 keeps pressure-stable coupling contact with the end face of the test bench. The emission sensor 3 is placed in a fixing seat 11 at a distance of 300 mm from the near end face of the test bench 1, and is fixedly by using a cover plate 12 to keep stable coupling contact with a surface of the test bench. The signal generator 2 is connected to the emission sensor 3 by using the third signal line 10. A bracket 17 is mounted on the far end face of the test bench 1, and keeps, together with the fixing seat 11 and the clamping seat 13, the test bench horizontally placed on a desktop. The tested sensor 4 is successively connected to the first signal line 5, the preamplifier 6, and the second signal line 7, and transmits a tested signal to the acoustic emission instrument 8 and the computer device 9, and the computer device 9 calculates and displays an amplitude of an acquired acoustic emission signal.

Step 2: Signal excitation and reception: using the signal generator to modulate a single pulse signal to excite the emission sensor, and adjusting a pulse width and a pulse voltage, to enable that an amplitude of an acoustic emission signal received by a first tested sensor is 80 dB, denoted as A(1). An initial test condition is completed. A sensitivity consistency deviation threshold is set to 6 dB.

Under the initial test condition, the pulse signal modulated by the signal generator, the emission sensor, the channel of the acoustic emission instrument, the signal line, the preamplifier, and the signal cable remain unchanged, the tested sensor is changed to the 17 tested sensors in the first group for successive testing, and response amplitudes A(2) to A(18) received by the sensors are recorded, as shown in Table 1.

TABLE 1

Sensitivity test results of the first group of acoustic emission sensors

| Sensor test value | A(1) | A(2) | A(3) | A(4) | A(5) | A(6) |
|---|---|---|---|---|---|---|
| Amplitude (dB) | 80.0 | 81.5 | 80.2 | 78.1 | 80.8 | 79.6 |
| Sensor test value | A(7) | A(8) | A(9) | A(10) | A(11) | A(12) |
| Amplitude (dB) | 82.2 | 79.8 | 68.3 | 80.4 | 76.5 | 78.6 |
| Sensor test value | A(13) | A(14) | A(15) | A(16) | A(17) | A(18) |
| Amplitude (dB) | 81.2 | 77.8 | 80.3 | 72.1 | 78.4 | 80.6 |

Step 3: Test a sensitivity consistency deviation $\Delta A_i$. First, calculate an average amplitude $\overline{A_i}$ of the first group of 18 tested sensors, where $$\overline{A_i} = \frac{\sum_{i=1}^{n} A(i)}{n} = \frac{\sum_{i=1}^{18} A(i)}{18} \approx 78.68.$$

Observe amplitudes of all the tested sensors, sensors whose values exceed a value of $\overline{A_i} \pm 6$ dB are A(9) and A(16), and in this case, sensitivity consistency of the two sensors is low, denoted as $A(9)_{1(1)}$ and $A(16)_{1(2)}$. For test results of the 16 acoustic emission sensors in a threshold range, sensitivity consistency deviations of the acoustic emission sensors are calculated according to the method for testing sensitivity consistency of an acoustic emission sensor, as shown in Table 2.

$$\overline{A_{iX}} = \frac{\sum_{i=1}^{n} A(i) - \sum_{j=1}^{m} A(i)_{l(j)}}{n-m} =$$

$$\frac{\sum_{i=1}^{18} A(i) - \sum_{j=1}^{2} A(i)_{l(j)}}{18-2} = \frac{\sum_{i=1}^{18} A(i) - A(9)_{l(1)} - A(16)_{l(2)}}{16} = 79.75$$

$$\Delta A_i = \left| \frac{A(i) - \overline{A_{iX}}}{\overline{A_{iX}}} \right| \times 100\% = \left| \frac{A(i) - 79.75}{79.75} \right| \times 100\%$$

A sensitivity consistency deviation $\Delta A_{iX}$ (calculated based on the sensitivity consistency deviation threshold is:

$$\Delta A_{iX} = \frac{X}{\overline{A_{iX}}} \times 100\% = \frac{6}{79.75} \times 100\% \approx 7.5\%$$

TABLE 2

Sensitivity consistency deviations of the first group of acoustic emission sensors

| Sensor consistency deviation | $\Delta A_1$ | $\Delta A_2$ | $\Delta A_3$ | $\Delta A_4$ | $\Delta A_5$ | $\Delta A_6$ |
|---|---|---|---|---|---|---|
| Deviation value | 0.3% | 2.2% | 0.6% | 2.1% | 1.3% | 0.2% |
| Sensor consistency deviation | $\Delta A_7$ | $\Delta A_8$ | $\Delta A_9$ | $\Delta A_{10}$ | $\Delta A_{11}$ | $\Delta A_{12}$ |
| Deviation value | 3.0% | 0.1% | — | 0.8% | 4.1% | 1.4% |

TABLE 2-continued

Sensitivity consistency deviations of the first group of acoustic emission sensors

| Sensor consistency deviation | $\Delta A_{13}$ | $\Delta A_{14}$ | $\Delta A_{15}$ | $\Delta A_{16}$ | $\Delta A_{17}$ | $\Delta A_{18}$ |
|---|---|---|---|---|---|---|
| Deviation value | 1.8% | 2.4% | 0.7% | — | 1.7% | 1.1% |

Step 4: Compare consistency of the multiple tested sensors. For consistency of the acoustic emission sensors, a first preset deviation range is set to (0, 2.0%] and a second preset deviation range is set to (2.0%, 3.7%] according to sensor types and an actual detection requirement. Therefore, for the first group of 18 tested acoustic emission sensors, sensitivity deviations of the sensors are determined according to a consistency deviation method, to obtain sensitivity consistency results of the sensors. A sensor whose sensitivity consistency belongs to the first preset deviation range has first sensitivity consistency, denoted as A, a sensor whose sensitivity consistency belongs to the second preset deviation range has second sensitivity consistency, denoted as B, and a sensor whose sensitivity consistency exceeds the second preset deviation range has third sensitivity consistency, denoted as C. Refer to Table 3.

TABLE 3

Sensitivity consistency results of the first group of acoustic emission sensors

| Sensor No. | 1 | 2 | 3 | 4 | 5 | 6 |
|---|---|---|---|---|---|---|
| Sensitivity consistency | A | B | A | B | A | A |
| Sensor No. | 7 | 8 | 9 | 10 | 11 | 12 |
| Sensitivity consistency | B | A | Low | A | C | A |
| Sensor No. | 13 | 14 | 15 | 16 | 17 | 18 |
| Sensitivity consistency | A | B | A | Low | A | A |

In summary, according to an analysis result of a sensitivity consistency test of the first group of acoustic emission sensors, acoustic emission inspection is performed on an actual detection object that is a cylindrical container. It is recommended that 11 acoustic emission sensors having the first sensitivity consistency are preferably selected for the cylindrical container for positioning a cylinder. If a quantity of the sensors is insufficient, 4 acoustic emission sensors having the second sensitivity consistency are added for positioning. Using this selection scheme of the acoustic emission sensors not only meets a requirement of the acoustic emission inspection, but also fully utilizes an advantage of sensitivity consistency of the acoustic emission sensors, so that a more accurate detection result is obtained.

Similarly, testing and evaluating of sensitivity consistency is performed on the second group of 18 acoustic emission sensors by using the foregoing steps, and a sensitivity consistency deviation threshold is set to 6 dB. The test steps are the same as those of the first group. Details are not described again. Only test and analysis results are shown as follows:

For response amplitudes received by the second group of 18 tested sensors, refer to Table 4.

TABLE 4

Sensitivity test results of the second group of acoustic emission sensors

| Sensor test value | A(1) | A(2) | A(3) | A(4) | A(5) | A(6) |
|---|---|---|---|---|---|---|
| Amplitude (dB) | 80.0 | 79.5 | 81.4 | 78.3 | 82.6 | 80.3 |
| Sensor test value | A(7) | A(8) | A(9) | A(10) | A(11) | A(12) |
| Amplitude (dB) | 81.7 | 79.8 | 88.2 | 83.4 | 78.9 | 82.1 |
| Sensor test value | A(13) | A(14) | A(15) | A(16) | A(17) | A(18) |
| Amplitude (dB) | 74.3 | 87.8 | 80.4 | 77.9 | 79.4 | 80.4 |

An average amplitude $\overline{A_i}$ of the second group of 18 tested sensors is calculated, where $$\overline{A_i} = \frac{\sum_{i=1}^{n} A(i)}{n} = \frac{\sum_{i=1}^{18} A(i)}{18} \approx 80.91.$$

Amplitudes of all the tested sensors are observed, sensors that whose values exceed a value of $\overline{A_i} \pm 6$ dB are A(9), A(13), and A(14), and in this case, sensitivity consistency of the three sensors is low, denoted as $A(9)_{1(1)}$, $A(13)_{1(2)}$, and $A(14)_{1(3)}$. For test results of the 15 acoustic emission sensors in a threshold range, sensitivity consistency deviations of the acoustic emission sensors are calculated. Refer to Table 5.

$$\overline{A_{iX}} = \frac{\sum_{i=1}^{n} A(i) - \sum_{j=1}^{m} A(i)_{l(j)}}{n-m} = \frac{\sum_{i=1}^{18} A(i) - \sum_{j=1}^{2} A(i)_{l(j)}}{18-3} =$$

$$\frac{\sum_{i=1}^{18} A(i) - A(9)_{i(1)} - A(13)_{i(2)} - A(14)_{i(3)}}{15} \approx 80.41$$

$$\Delta A_i = \left|\frac{A(i) - \overline{A_{iX}}}{\overline{A_{iX}}}\right| \times 100\% = \left|\frac{A(i) - 80.41}{80.41}\right| \times 100\%$$

A sensitivity consistency deviation $\Delta_{iX}$ calculated based on the sensitivity consistency deviation threshold is:

$$\Delta A_{iX} = \frac{X}{\overline{A_{iX}}} \times 100\% = \frac{6}{80.41} \times 100\% \approx 7.5\%$$

TABLE 5

Sensitivity consistency deviations of the second group of acoustic emission sensors

| Sensor consistency deviation | $\Delta A_1$ | $\Delta A_2$ | $\Delta A_3$ | $\Delta A_4$ | $\Delta A_5$ | $\Delta A_6$ |
|---|---|---|---|---|---|---|
| Deviation value | 0.5% | 1.1% | 1.2% | 2.6% | 2.7% | 0.1% |
| Sensor consistency deviation | $\Delta A_7$ | $\Delta A_8$ | $\Delta A_9$ | $\Delta A_{10}$ | $\Delta A_{11}$ | $\Delta A_{12}$ |
| Deviation value | 1.6% | 0.8% | — | 3.7% | 1.9% | 2.1% |

TABLE 5-continued

Sensitivity consistency deviations of the second group of acoustic emission sensors

| Sensor consistency deviation | $\Delta A_{13}$ | $\Delta A_{14}$ | $\Delta A_{15}$ | $\Delta A_{16}$ | $\Delta A_{17}$ | $\Delta A_{18}$ |
|---|---|---|---|---|---|---|
| Deviation value | — | — | 0.01% | 3.1% | 1.3% | 0.01% |

A first preset deviation range is set to (0, 2.0%] and a second preset deviation range is (2.0%, 3.5%]) according to sensor types and an actual detection requirement. Therefore, for the second group of 18 tested acoustic emission sensors, sensitivity deviations of the sensors are determined according to the consistency deviation method, to obtain sensitivity consistency results. Refer to Table 6.

TABLE 6

Sensitivity consistency results of the second group of acoustic emission sensors

| Sensor No. | 1 | 2 | 3 | 4 | 5 | 6 |
|---|---|---|---|---|---|---|
| Sensitivity consistency | A | A | A | B | B | A |
| Sensor No. | 7 | 8 | 9 | 10 | 11 | 12 |
| Sensitivity consistency | A | A | Low | C | A | B |
| Sensor No. | 13 | 14 | 15 | 16 | 17 | 18 |
| Sensitivity consistency | Low | Low | A | B | A | A |

In summary, according to an analysis result of a sensitivity consistency test of the second group of acoustic emission sensors, acoustic emission inspection is performed on an actual detection object that is a steel structure. It is recommended that 10 acoustic emission sensors having first sensitivity consistency are preferably selected for positioning. If a quantity of the sensors is insufficient, 4 acoustic emission sensors having second sensitivity consistency are added for positioning. This selection scheme of the acoustic emission sensors is used, although the $9^{th}$ and $14^{th}$ acoustic emission sensors with highest sensitivity are not selected, a batch of sensors with high sensitivity consistency are selected for detection, which provides a higher guarantee for accuracy of positioning results.

In particular, the method in the present disclosure is applicable to an engineering detection application in which multiple sensors are used to detect an acoustic emission signal and are used in array arrangement to position an acoustic emission source. In practice, multiple sensors purchased need to be calibrated before on-site detection. However, a positioning effect may not be optimal when multiple sensors in different situations such as a worn sensor and a new sensor are used together. A reason for this is that cooperation of a multi-sensor array is needed for positioning. When sensitivity of only one or a few sensors is far higher than the requirement of a detection site, the positioning precision of a combined array of the sensor or the few sensors and multiple other sensors is not high, which is closely related to a positioning principle of an amplitude threshold of the sensor. Therefore, the present disclosure proposes a consistency test method, to ensure that when sensitivity of an array sensor meets a test requirement, a difference between sensitivity of multiple different sensors used for detection is reduced as much as possible, thereby improving positioning precision by about 20%-40%. This breaks a technological inertia thinking that higher sensitivity of a used sensor usually indicates more accurate positioning. For example, when a sensor with sensitivity 98 dB and a group of sensors with sensitivity around 87 dB-90 dB are used for positioning, due to noise on a site, a noise threshold of the sensor of 98 dB usually needs to be higher than 6 dB that is a noise threshold of other sensors, which does not really take advantage of high sensitivity. A noise threshold needs to be empirically adjusted and pre-estimated, which is not conducive to precision control of a detection result and reproducibility detection. After a consistency test is adopted in the present disclosure, it is ensured that sensitivity of sensors used on the detection site is correspondingly consistent in aggregation, the noise threshold is set consistently, positioning precision is greatly improved, and accuracy and validity of the detection result are effectively ensured.

Specific descriptions of sensitivity consistency and sensitivity calibration described in the present disclosure are as follows:

1. The two have different concepts and meanings. Sensitivity reflects a response value of a signal received by a sensor. Usually, higher sensitivity is better. In a detection standard, a requirement of a minimum sensitivity value is set for a single sensor. The sensitivity consistency reflects regularity and uniformity of response values of a group of sensors to a same acoustic source. A smaller difference between amplitudes is better, and a requirement of a maximum consistency difference is set in the present disclosure.

2. The two are used for different purposes. Calibration is used to measure a spectrum curve of a single sensor, to obtain response amplitudes of the sensor at different frequencies, that is, an absolute value of sensitivity of the sensor is tested based on a theoretical calculation, to provide a basis for selecting sensor types for different detection purposes. A sensitivity consistency test is based on an actual engineering requirement. Under a guidance of the theoretical calculation, a reasonable and fixed test condition is determined to test response amplitudes of a group of sensors, to obtain a relative difference of sensitivity consistency of the sensors, and provide a batch of sensors with good consistency for detection implementation.

3. Actual application requirements of tests are different. A sensitivity test is performed before on-site acoustic emission inspection, which can effectively remove a response difference factor of a sensor in on-site sensitivity verification of an acoustic emission system, detect a connection fault of a system channel and another fault in time, and improve detection efficiency. The sensitivity consistency test refers to a combined application of the actual engineering requirement and the theoretical calculation, and focuses on testing sensitivity-related uniformity of a group of sensors, which helps simplify the test apparatus and the test method, and improve positioning precision of a positioning group and accuracy of an amplitude test.

Figure 7:
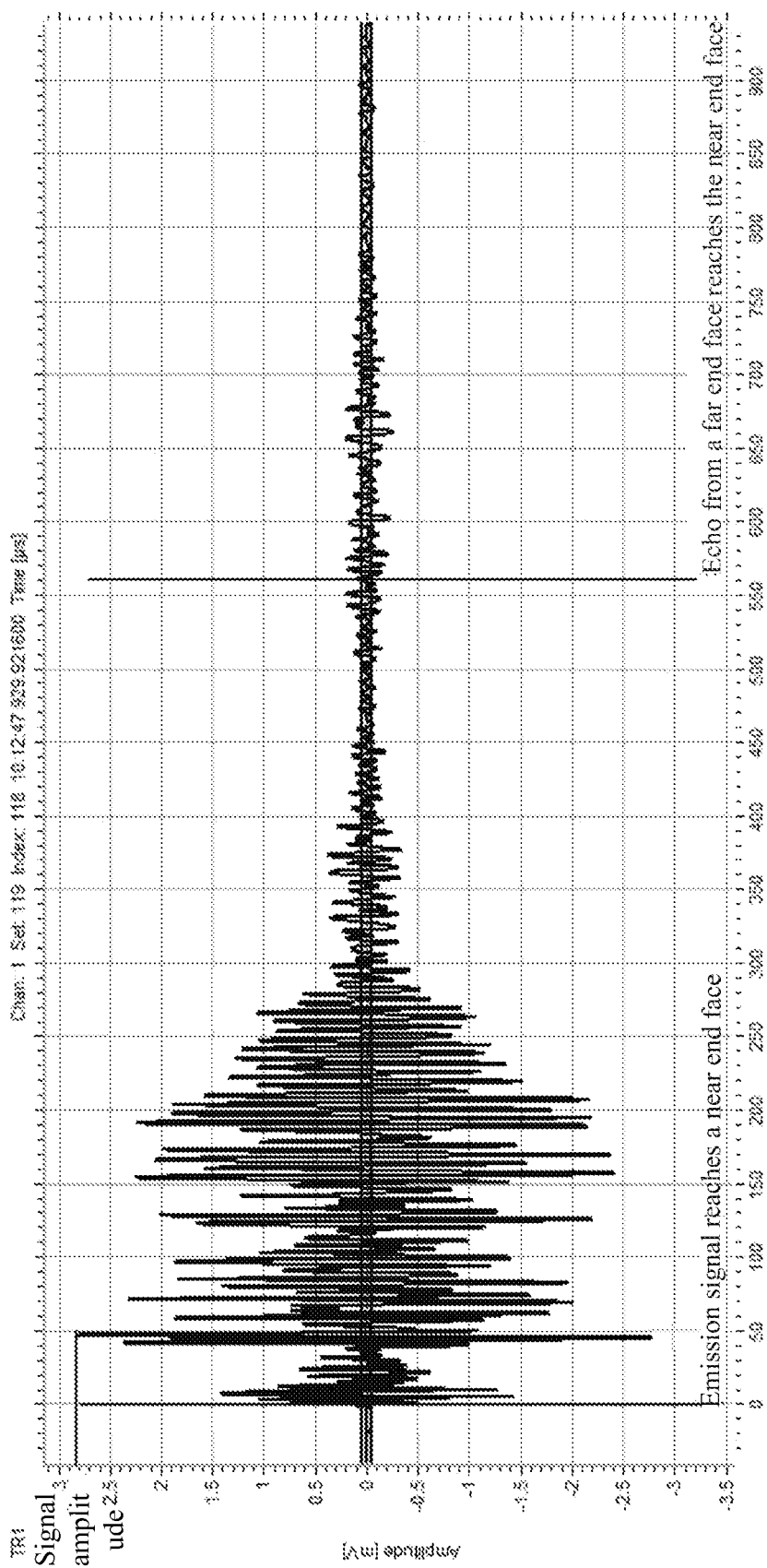
FIG. 7 is a waveform diagram of an acoustic emission signal received by a tested sensor.

4. Calculation is performed based on a velocity of sound of PMMA and a difference of sonic paths of acoustic waves propagating in the test bench. An echo from the far end face of the test bench arrives only after a period of time when the tested sensor receives an emission signal, which does not affect an amplitude test of the received signal. Refer to FIG. 7.

The above are merely preferred specific embodiments of the present disclosure, but the protection scope of the present disclosure is not limited thereto. Any equivalent replacement or modification made by a person skilled in the art according to the technical solutions of the present disclosure and inventive concepts thereof within the technical scope of the present disclosure shall fall within the protection scope of the present disclosure.

What is claimed is:

1. An apparatus for testing sensitivity consistency of an acoustic emission sensor, comprising:
   a signal generator, an emission sensor, a first signal line, a preamplifier, a second signal line, an acoustic emission instrument, a computer device, and a third signal line, wherein a tested sensor is successively connected to the first signal line, the preamplifier, and the second signal line, and transmits a tested signal to the acoustic emission instrument and the computer device; the computer device calculates and displays an amplitude of an acquired acoustic emission signal; and a cylindrical polymethyl methacrylate (PMMA) rod with a length of 1000 mm and a diameter of 50 mm is used as a test bench, and one end of the test bench near the tested sensor is a near end face, and an opposite end is a far end face; and
   the emission sensor is placed in a fixing seat at a distance of 300 mm from the near end face of the test bench, and is fixedly by using a cover plate to keep stable coupling contact with a surface of the test bench, and the emission sensor is connected to the signal generator by using the third signal line; a clamping seat is mounted on the near end face of the test bench by using a clamping block;
   the tested sensor is disposed in a mounting cylinder, there is a circular ear plate on a body of the mounting cylinder, a pressure spring is disposed inside the mounting cylinder, the circular ear plate and the mounting cylinder are inserted into a clamping groove corresponding to the clamping seat through pressing, and under an action of the pressure spring, an end face of the tested sensor keeps pressure-stable coupling contact with the end face of the test bench; and
   a bracket is mounted on the far end face of the test bench, and keeps, together with the fixing seat and the clamping seat, the test bench horizontally placed on a desktop.

2. A test method based on the apparatus for testing sensitivity consistency of an acoustic emission sensor according to claim 1, comprising the following steps:
   step 1: conducting signal excitation and reception, specifically: adjusting a width and an amplitude of a pulse excitation signal of the signal generator, so that an amplitude of an acoustic emission signal received by the tested sensor reaches 80% of a full-span value of the amplitude;
   and when the pulse signal remains unchanged, successively testing, in a same location, response amplitudes of the acoustic emission signal received by other sensors;
   step 2: testing a sensitivity consistency deviation $\Delta A_i$, wherein a total quantity of tested sensors is n, and an amplitude obtained by an $i^{th}$ tested sensor is A(i) in dB; and an average amplitude of all the tested sensors is $\overline{A_i}$, and $$\overline{A_i} = \frac{\sum_{i=1}^{n} A(i)}{n};$$

and setting a sensitivity consistency deviation threshold to X dB, observing amplitudes of all the tested sensors, denoting a sensitivity value of a tested sensor whose value exceeds a value of $\overline{A_i}$ by $\pm X$ dB as $A(i)_{i(j)}$, and recording a quantity of the tested sensors with $A(i)_{i(j)}$ as m, wherein in this case, a sensitivity consistency deviation $\Delta A_i$ of each tested sensor (4) in a threshold range is:

$$\Delta A_i = \left| \frac{A(i) - \overline{A_{iX}}}{\overline{A_{iX}}} \right| \times 100\% \text{ and } \overline{A_{iX}} = \frac{\sum_{i=1}^{n} A(i) - \sum_{j=1}^{m} A(i)_{i(j)}}{n-m}$$

a sensitivity consistency deviation $\Delta A_{iX}$ calculated based on the sensitivity consistency deviation threshold is $$\Delta A_{iX} = \frac{X}{\overline{A_{iX}}} \times 100\%;$$

and step 3: comparing consistency of the tested sensors; determining a first preset deviation range and a second preset deviation range according to models of the tested sensors and a detection requirement, wherein any value in the first preset deviation range is less than any value in the second preset deviation range, and the any value in the second preset deviation range is less than the sensitivity consistency deviation $\Delta A_{iX}$ calculated based on the sensitivity consistency deviation threshold; and when $\Delta A_i$ belongs to the first preset deviation range, first sensitivity consistency is met; when $\Delta A_i$ belongs to the second preset deviation range, second sensitivity consistency is met; or when $\Delta A_i$ exceeds the second preset deviation range, it is third sensitivity consistency; determining, according to $\Delta A_i$ obtained by each tested sensor, that a range of sensitivity consistency of the tested sensor belongs to the first sensitivity consistency, the second sensitivity consistency, or the third sensitivity consistency; according to a requirement of actual detection for a quantity of sensors, preferably selecting multiple tested sensors within a first sensitivity consistency range for acoustic emission inspection; and when a quantity of the tested sensors in the first sensitivity consistency range does not meet a detection requirement, selecting multiple tested sensors in a second sensitivity consistency range, and so on, wherein after the consistency detection, when multiple tested sensors selected are used for acoustic emission positioning, detection, and monitoring, a consistent sensitivity response makes detection parameter settings of the sensors simple and consistent, improves debugging convenience of a positioning test, improves positioning precision, and ensures accuracy and validity of a detection result.

3. The test method based on the apparatus for testing sensitivity consistency of an acoustic emission sensor according to claim 2, wherein the emission sensor selects a broadband sensor, and a frequency band range of the broadband sensor is capable of covering a frequency band range of the tested sensor, or a sensor of a same model as the tested sensor is used as the emission sensor.

4. The test method based on the apparatus for testing sensitivity consistency of an acoustic emission sensor according to claim 2, wherein an excitation signal modulated by the signal generator is excited by using a single pulse signal, and width selection of the pulse signal matches a frequency band feature of the tested sensor.

* * * * *